June 12, 1928.
M. ANDERSON
1,673,659
EDUCATIONAL OR ADVERTISING APPLIANCE
Filed Jan. 10, 1928     2 Sheets-Sheet 1
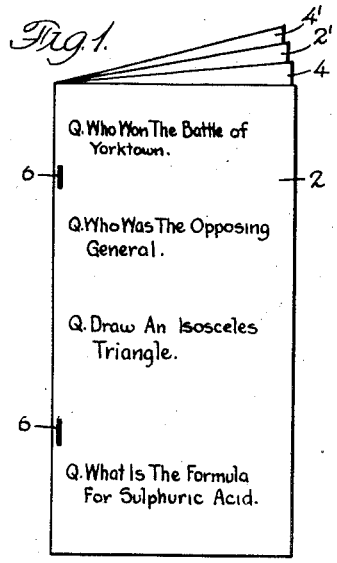
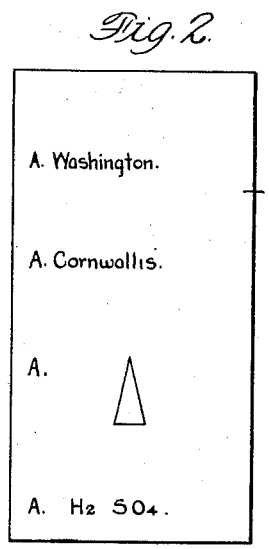
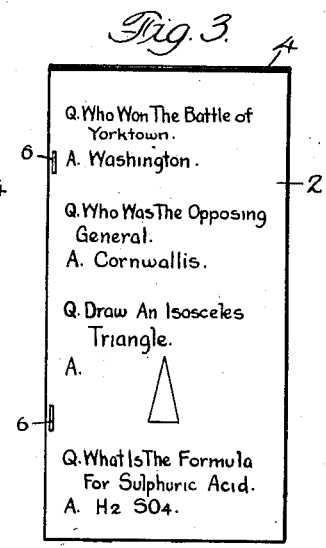
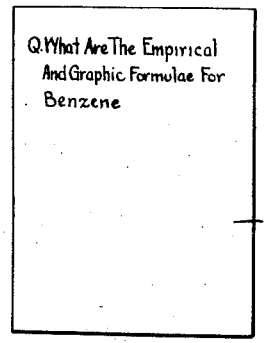
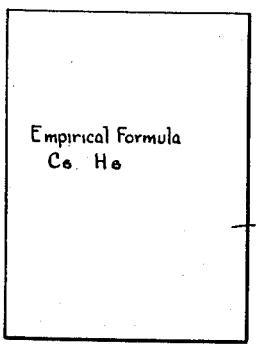
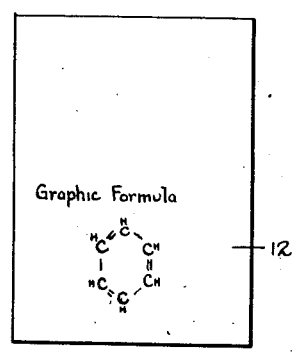
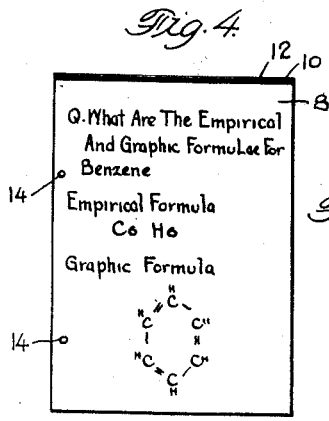
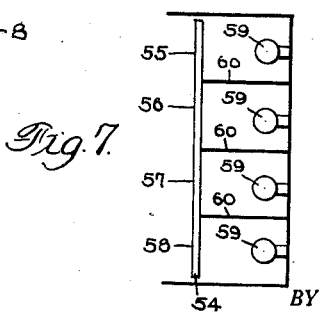
INVENTOR.
Merrill Anderson
BY Martin T. Fisher ATTORNEY.

June 12, 1928. 1,673,659
M. ANDERSON
EDUCATIONAL OR ADVERTISING APPLIANCE
Filed Jan. 10, 1928 2 Sheets-Sheet 2
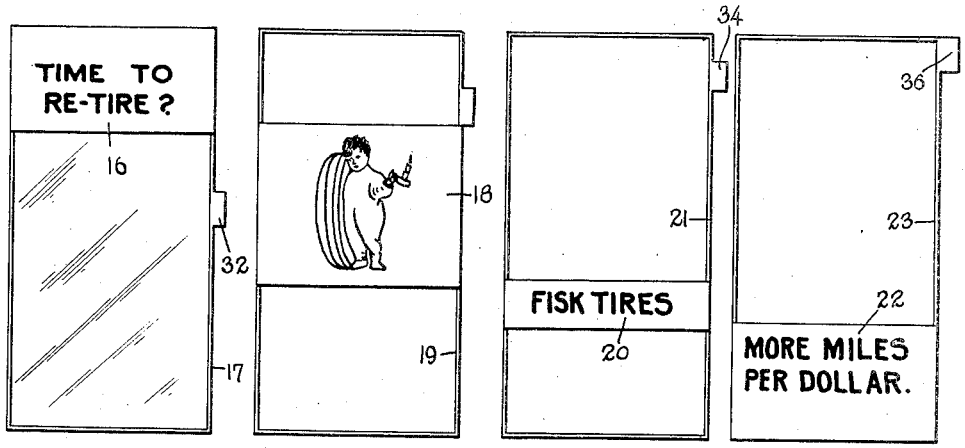
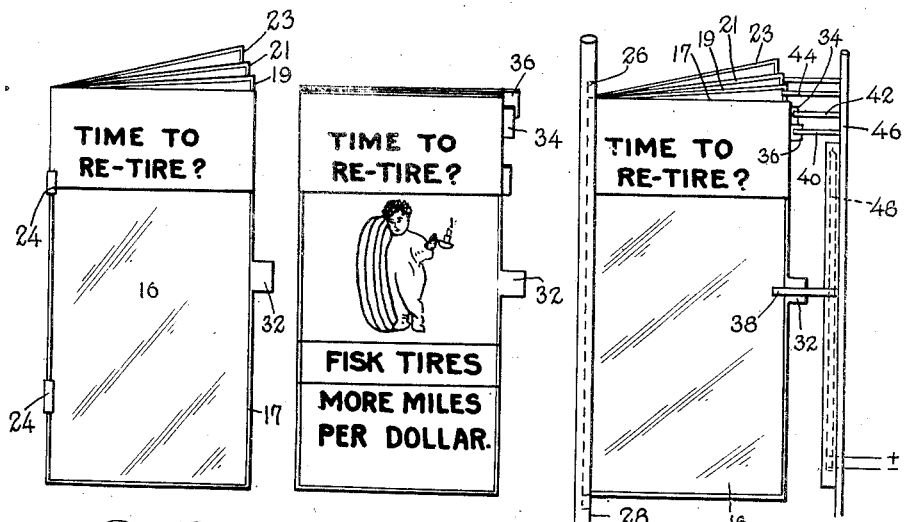
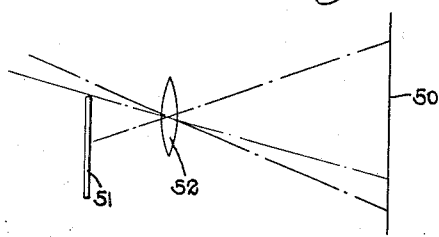
INVENTOR.
Merrill Anderson
BY
Martin T. Fisher ATTORNEY.

Patented June 12, 1928.

1,673,659

UNITED STATES PATENT OFFICE.

MERRILL ANDERSON, OF NEW YORK, N. Y.

EDUCATIONAL OR ADVERTISING APPLIANCE.

Application filed January 10, 1928. Serial No. 245,745.

This invention is an educational or amusement device, which may also be used in advertising.

The invention, in its broadest aspect, comprises a translucent or nearly transparent top sheet having appropriate symbols on it, and a bottom or underlying sheet containing symbols cooperating with and supplementary to, the symbols on the top sheet. When the top sheet is placed over the bottom sheet, the symbols on the bottom sheet are readable through the translucent top sheet, and of course the symbols on the top sheet are readable at the same time. When the two sheets are slightly separated, the symbols on the bottom sheet will not be visible through the top sheet.

More specifically, the top sheet may contain one or more questions, and the bottom sheet the answers to the respective questions.

The user, with the sheets slightly separated, so that he cannot read the answers to the questions, considers the questions and decides what his answer is to be. He then presses the top sheet tightly against the bottom sheet, and reads the correct answer, which is so placed, on the bottom sheet as to be alongside the question appearing on the top sheet.

Any appropriate symbols may be used on the top and bottom sheets; the symbols may be questions and answers; they may be words, diagrams, pictures, formulæ, curves, etc.

As many sheets as desired may be used. The sheets may be attached together in the form of a small book or pamphlet. Successive underlying bottom sheets may be brought successively against the top sheet, and so build up successively a picture, diagram or story.

Certain embodiments of the invention are illustrated in the accompanying drawings, in which:

Fig. 1 is a perspective view of the device;
Fig. 2 is a view of a bottom sheet;
Fig. 3 shows the top sheet tightly against the bottom sheet;
Fig. 4 is a modification of the top sheet;
Figs. 5 and 6 show successive bottom sheets;
Fig. 7 shows the sheets of Figs. 4, 5 and 6 in superposed relation;
Fig. 8 is a view of a modified top sheet;
Figs. 9, 10 and 11 are successive underlying bottom sheets to be used with each other and with Fig. 8;
Fig. 12 shows the sheets of Figs. 8–11 assembled in spaced relation;
Fig. 13 shows the same sheets assembled in superposed relation; and
Fig. 14 shows a mechanical device for bringing the underlying sheets successively against the top sheet.

Referring now to these drawings, in which similar reference characters represent similar parts, 2 indicates a top sheet formed of any suitable translucent or nearly transparent material, such as tissue paper, celluloid, mica or the like. On this top sheet is printed a number of questions.

The bottom sheet 4, which may be opaque, has printed on it the answers to the questions on the top sheet, so placed that when the top sheet is superposed on the bottom sheet, as in Fig. 3, the answers to the questions appear alongside, just underneath the questions.

Any suitable number of sheets may be used and referring to Fig. 1 the sheet 2' may have further questions on it and the sheet 4' may have appropriate answers to these questions. The several sheets may be held together in any suitable way as by staples 6, for example, to form a small book of pamphlet.

Referring now to Figs. 4, 5 and 6, the top sheet 8 may contain a question requiring two answers, one answer being shown on the first bottom sheet 10 and the second answer shown on the second bottom sheet 12. The sheets 8 and 10 are preferably of translucent material, while the sheet 12 is opaque or transparent. The sheets of Figs. 4, 5 and 6 are assembled in that order with the sheet 8 on top and may be held together by paper fasteners 14. When assembled as in Fig. 7, in close order, the question and both answers are simultaneously readable.

The symbols or indicia on the top sheet may be in the form of actual interrogations, requiring answers, or may be in the form of statements, not phrased as questions, but requiring an answer just as much as if phrased as a question. For example, Fig. 1 has the wording "Draw an isosceles triangle". By way of further example of similar wording requiring answers, although not framed as questions, may be mentioned: "The leading character in 'The Merchant of Venice'." "The man who discovered the North Pole". Such statements call for answers and are in the nature of questions. The term "question" or "questions" in the claims is intended therefore to cover any wording of an interrogatory character requiring an answer, whether or not phrased as a question. As shown by the triangle in Fig. 2, a picture may constitute an answer to a question.

Referring to Figs. 8 to 11, 16 indicates the transparent or translucent top sheet, mounted in a thin frame 17; the successive bottom sheets are mounted in thin frames, sheet 18 in frame 19; sheet 20 in frame 21; and sheet 22 in frame 23. While the successive bottom sheets could be as large as their frames, the preferred arrangement is as shown, so that even the last bottom sheet is directly readable through the top sheet, without having to be read through the intermediate sheets. The frames could be dispensed with and sheets all as large as the top sheet used, if desired.

The figures, letters, symbols, etc. may be opaque, or may be translucent; and could be in any desired color or combination of colors. Also, the sheets 16, 18, 20 and 22 may be in any desired color or combination of colors.

When the frames or sheets are assembled in loose order, as in Fig. 12, the data on the top sheet only is visible. As successive frames or sheets are brought into close contact, the data on all the sheets become successively visible until all are visible, as shown in Fig. 13. The several sheets may be secured together by a clamp or fastener 24.

In Fig. 14 is shown a mechanical arrangement for bringing the successive underlying bottom sheets into successive close order positions below the top sheet. In this figure, the group of frames or sheets are gripped with spring pressure in a slot 26 in a rod 28, which is rotated in a clockwise direction by a clockwork mechanism 30. The top frame 17 is provided with a tab 32; the second frame 19 has no tab; the third frame 21 has a tab 34; and the fourth frame 23 has a tab 36. The tabs 34, 36 and 32 are successively wider, as shown. A number of spring fingers 38, 40, 42 and 44 secured to a rod 46 are positioned to cooperate with the tabs, as follows:

The clock-work mechanism rotates the frames until the finger 38 stops the top frame, while finger 44 holds back the others; the clock-work continues to rotate the rod 28, eventually causing the finger 44 to release the second frame, which then snaps up close behind the top sheet. As the clock-work continues to rotate the shaft, finger 42 releases tab 34 and the third frame 21 and snaps up behind sheet 18.

The clock-work continues to rotate and finally finger 40 releases tab 36 bringing the last frame and sheet up into position behind the others, so that the entire picture is visible, as in Fig. 13. The clock-work continues to rotate and finally finger 38 releases tab 32, all the sheets turn all the way around and the cycle of operations is repeated.

An elongated incandescent light 48 is mounted alongside and a little to the rear of the plane of the top sheet 16, Fig. 4, so as to shine through the several sheets from the rear, when they are in close order, and so add to the clarity and display value of the invention.

The several questions, answers, pictures, diagrams, symbols, etc. appearing on 18, 20, and 22 could be successively projected from the rear onto the transparent or translucent top sheet, to build up a complete picture as in Fig. 13. The picture on the top sheet 16 could likewise be a projected picture. The preferred way of doing this is by means of a slide 50 which has on it the complete picture of Fig. 13. The slide is put in a projection machine of known type, and an opaque screen 51 held in front of the lens 52 so as to cut off all the picture except the top part; the screen is then moved to uncover more of the lens, and so uncover more of the picture, and so on, until the entire picture is projected.

Another way of successively projecting the questions, answers, pictures, diagrams, etc. is shown in Fig. 16. In this figure, a transparent sheet or screen 54 is divided into four panels 55, 56, 57 and 58, although the number of panels is entirely optional. Panel 55 may have a question on it, and 56 the answer to that question; so also with 57 and 58. Or panels 55, 56, 57 and 58 may contain successive parts of a picture, like the panels 16, 18, 20 and 22. Behind each panel is a light 59, separated from each other by screens 60. The matter appearing on any panel may be caused to stand out by turning on the respective light; the turning on and off of the lights may be done manually or automatically.

While I have illustrated my invention in some detail, it should be understood that this disclosure is illustrative and not restrictive of the invention, and that it may be carried out in other ways, as expressed within the scope of the claims.

I claim as my invention:

1. An educational device, comprising two sheets, one of which contains a number of questions and the other of which contains the answers to the questions, one of the sheets being translucent, means for holding the sheets in definite relationship with each other, so that when the sheets are separated the answers are not visible, but when superposed the answers to the questions are visible adjacent the questions and both are readable together.

2. An educational device comprising a top sheet which is translucent and which contains a question and a bottom sheet containing the appropriate answer to the question, and means for holding the two sheets in definite relationship with each other so that when the sheets are separated the answer is not visible, but when superposed and pressed together, the answer to the question is readable through the top sheet, alongside the question.

3. In a device of the character described, the combination of a plurality of sheets, means for holding the sheets in definite relationship with one another, time controlled means for bringing each underlying sheet into close contact with the sheet next above it at successive time intervals, and means for holding the top sheet in place until the lower sheets are assembled in close order behind it, the sheets being translucent so that symbols on a lower sheet are visible through the translucent part of the sheet next above it.

4. In a device of the character described, the combination of a plurality of sheets, means for holding the sheets in definite relationship with one another, time controlled means for bringing each underlying sheet into close contact with the sheet next above it at successive time intervals, said means comprising clockwork mechanism for moving the sheets, tabs at different places on the sheets, and fingers adapted first to engage the tabs, and then to release them in succession, whereby the top sheet is held in place and the other sheets assembled successively in close order behind the top sheet, the sheets being provided with translucent portions so that symbols on a lower sheet are readable through the translucent part of an upper sheet.

5. In a device of the character described, the combination of a plurality of sheets, means for holding the sheets in definite relationship with one another, time controlled means for bringing each underlying sheet into close contact with the sheet next above it at successive time intervals, means for holding the top sheet in place until the lower sheets are assembled in close order behind it, the sheets being translucent so that symbols on a lower sheet are visible through the translucent part of the sheet next above it, and a light positioned at one side of the sheets when assembled in close order, and a little behind them, so as to shine through the assembled sheets.

6. In a device of the character described, the combination of a plurality of sheets, means for holding the sheets in definite relationship with one another, time controlled means for bringing each underlying sheet into close contact with the sheet next above it at successive time intervals, said means comprising clockwork mechanism for moving the sheets, and fingers adapted first to engage the tabs, and then to release them in succession, whereby the top sheet is held in place and the other sheets assembled successively in close order behind the top sheet, the sheets being provided with translucent portions so that symbols on a lower sheet are readable through the translucent part of an upper sheet, and a light positioned at one side of the sheets when assembled in close order, and a little behind them, so as to shine through the assembled sheets.

In testimony whereof I affix my signature.

MERRILL ANDERSON.